CONTINUOUS ELECTRICAL OUTLET WITH GROUND

Original Filed July 13, 1970

Inventor
Robert W. McFarlin
By
Wheeler, Wheeler, House & Clemency
Attorneys

United States Patent

Re. 28,404

Reissued Apr. 29, 1975

28,404

CONTINUOUS ELECTRICAL OUTLET WITH GROUND

Robert W. McFarlin, Box 563,
Pompano Beach, Fla. 33061

Original No. 3,668,601, dated June 6, 1972, Ser. No. 54,377, July 13, 1970. Application for reissue May 30, 1974, Ser. No. 474,566

Int. Cl. H015 *3/16*

U.S. Cl. 339—14 R 8 Claims

Matter enclosed in heavy brackets [ ] appears in the original patent but forms no part of this reissue specification; matter printed in italics indicates the additions made by reissue.

ABSTRACT OF THE DISCLOSURE

An elongated electrical outlet having an extruded case is provided with electrical contacts and with a ground inserted longitudinally into the case where it is engaged by the ground prong of a plug when the electrical contact prongs of the plug engage the electrical contacts of the outlet. The cross section of the case permits the use of flat contact strips and concurrently provides support for the ground contact.

BACKGROUND OF INVENTION

In my previous U.S. Pat. No. 2,680,233, the central channel of the extruded housing had parallel sides and it was necessary, in order to assure good contact with the plug prongs, that the bus strips be deformed transversely of their length. Moreover, there was no way in which a ground bus could be incorporated without material additional cost.

SUMMARY OF INVENTION

The extruded non-conductive housing has flat bus strips maintained at oblique angles to each other by the form of the housing and particularly by the inward convexity of the outer walls and by downward convergence of the flanges of the central channel in the form of a keystone in cross section, whereby the flanges of the channel converge inwardly to provide acute angles with the remote side margins of the conductor strips. When the prongs of a plug are inserted at opposite sides of the channel into the chambers in which the contact strips are housed, the strips are caused to flex under the pressure of the plug prongs to assure good electrical contact between the prongs and the strips. At the same time, the converging side walls of the inner channel of the extruded housing are calculated to retain between them a third conductor strip which serves as a ground and has punched openings to receive the ground prong of a plug, such openings having tongues frictionally engaging the ground prong to establish good ground contact.

DESCRIPTION OF PREFERRED EMBODIMENT

Figure 1:
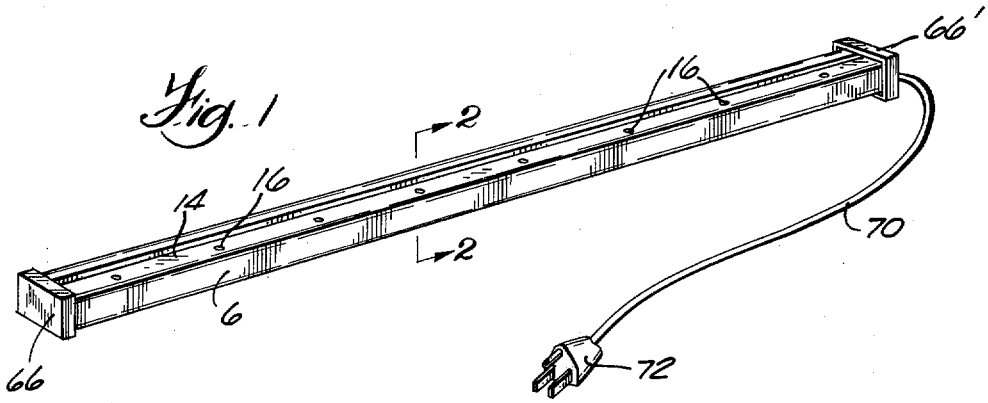
FIG. 1 is a view in perspective showing a continuous outlet embodying the invention.

The housing 6 is an extrusion of somewhat flexible synthetic resin which, despite its partial flexibility, is resilient enough to resist strongly any deformation from the form shown in the drawings.

The extruded housing comprises a central inverted channel at 8 having downwardly converging side walls 10 and 12 connected by an integral and generally horizontal web 14 in which holes 16 are punched at intervals.

Figure 2:
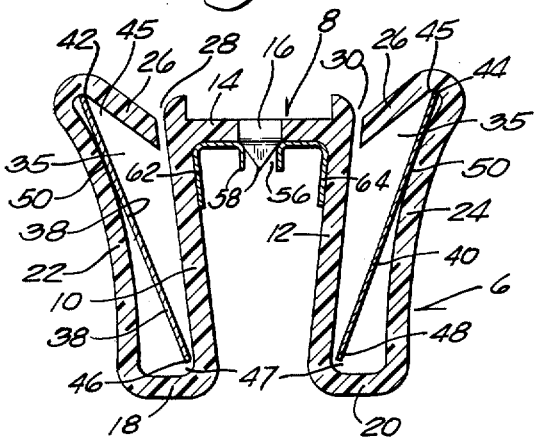
FIG. 2 is a view on an enlarged scale taken in cross section on the line 2—2 of FIG. 1.
Figure 3:
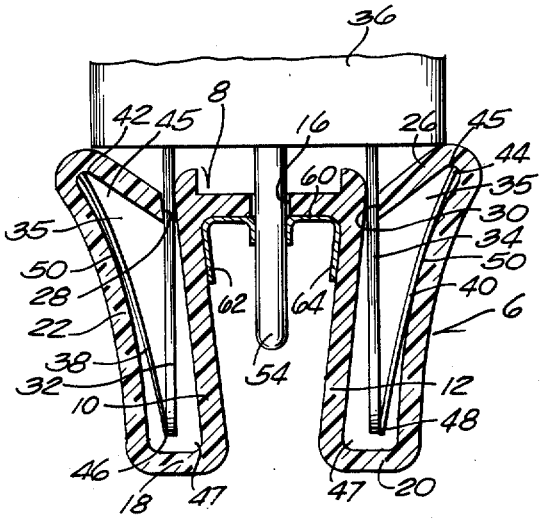
FIG. 3 is a view similar to FIG. 2 showing the appearance of the parts when an electrical plug with a ground prong is engaged with the various bus contact strips.
Figure 4:
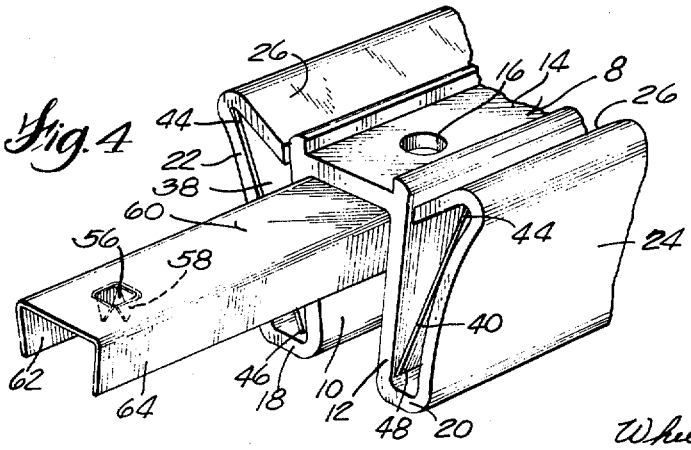
FIG. 4 is an enlarged fragmentary view in perspective showing how the strips are inserted into the extruded housing.

The lower margins of the side walls 10 and 12 of channel 8 connect integrally to the respective bottom walls 18 and 20, from which sides 22 and 24 extend upwardly on an outward curve as clearly appears in FIGS. 2 to 4. Each of the sides 22 and 24 is reversely bent to provide top flange 26 at an acute angle to the side and terminating in close proximity to the central channel 8, leaving elongated slots at 28 and 30 which are spaced to receive the prongs 32 and 34 of a conventional electrical plug 36. This leaves chambers 35 to receive the contact strips.

The bus contacts 38 and 40 are of such width that their upper margins 42, 44 are respectively engaged in the bights 45 between respective side walls 22 and 24 and the respective flanges 26. When the upper margins 44 are so engaged, the lower margins 46, 48 project into the angles 47 between the respective flanges 10 and 12 of the channel 8 and the respective bottom walls 18 and 20 connecting channel 8 with side walls 22 and 24.

With the bus strips pushed endwise into the elongated chambers 35 of extruded housing 6, an intermediate portion of each bus strip will bear against the inwardly convex portion 50 of the respective side wall as clearly shown in FIG. 2.

This will hold the lower margins 46 and 48 of the bus strips in a position to be sharply convergent downwardly beneath the slots 28 and 30 into which the prongs of the plug 36 are received.

As a result, the insertion of the plug 36 causes its prongs 32 and 34 to engage the respective bus strips 38 and 40 near their lower margins 46, 48 and to flex the strips transversely of their length, bending them about the convex surfaces 50 above described.

If the plug 36 has a grounding prong 54, this will enter one of the central openings 16 of the housing 6 to penetrate a corresponding opening 56 made by punching a plurality of tongues 58 in the grounding bus 60.

The grounding bus is inserted longitudinally into the extruded housing through one open end thereof. It has the form of a channel with side flanges 62 and 64 which are engaged by and supported and confined between the convergent sides 10 and 12 of the channel 8. The holes 56 formed by the punching of the tongues 58 are so spaced as to register with the openings 16 punched in the web of the central channel of the extruded housing.

With the several bus strips slid longitudinally into place within the housing 6, end caps 66 anchored by cement or otherwise to the housing 6 are preferably applied to preclude the bus strips from further longitudinal movement. A supply wire 70 having a conventional three-pronged plug 72 is attached through the end cap 66' and has its conductors (not shown) respectively soldered or otherwise electrically connected with the respective buses 38, 40, and 60.

I claim:

1. An elongated electrical outlet provided with continuous prong-receiving slots and having a ground contact for the ground prong of a plug which has its contact prongs disposed in said slots, said outlet comprising a dielectric housing having central and outer longitudinally extending chambers, said case including a central inverted channel having flanges constituting partitions between said chambers and downwardly converging from a central web with which said channel is provided to provide clearance of said channel flanges with said prongs beneath said slots, the flanges of said channel being connected with bottom walls of the outer chambers of said case, side walls of said outer chambers extending upwardly from the bottom wall, top walls extending back from said side walls toward said channel and free of connection therewith to provide said slots, the side walls and top walls being formed to provide bights, the side walls further being provided with fulcrum means, substantially flat and elongated contact strips having upper side margins engaged in the respective bights and disposed to extend longitudinally of the outer chambers, said contact strips being engaged with said fulcrum means and supported thereby in positions in which their lower side margins are proximate the flanges of said channel adjacent the bottom walls of said outer chambers and below and offset inwardly of said slots to be deflected away from the flanges of said channel by plug prongs inserted in the respective slots.

2. An elongated electrical outlet according to claim 1 in which the said fulcrum means is formed by convex portions of the said outer walls of the outer chamber, said contact strips being supported on the convex portions of the outer walls to dispose their lower margins beneath said slots in the path of plug prongs inserted through said slots.

3. An elongated electrical outlet according to claim 1 in which the material of said housing is resiliently flexible and the top walls have margins proximate the side flanges of the central channel to nearly close said slots, said top walls being flexibly yieldable upon insertion of plug prongs.

4. An elongated electrical outlet provided with continuous prong-receiving slots and having a ground contact for the ground prong of a plug which has its contact prongs disposed in said slots, said outlet comprising a dielectric housing having central and outer longitudinally extending chambers, said case including a central inverted channel having flanges constituting partitions between said chambers and downwardly converging from a central web with which said channel is provided, the flanges of said channel being connected with bottom walls of the outer chambers of said case, side walls of said outer chambers extending upwardly from the bottom wall, top walls extending back from said side wall toward said channel and free of connection therewith to provide said slots, the side walls and top walls being formed to provide bights, the side walls further being provided with fulcrum means, substantially flat and elongated contact strips having upper side margins engaged in the respective bights and disposed to extend longitudinally in the outer chambers, said contact strips being engaged with said fulcrum means and supported thereby in positions in which their lower side margins are proximate the flanges of said channel adjacent the bottom walls of said outer chambers and positioned beneath said slots to be deflected away from the flanges of said channel by plug prongs inserted in the respective slots and including a metallic ground in the form of a channel with a central web and downwardly converging side flanges extends longitudinally of the channel of said housing and has its flanges engaged with and supported by the downwardly convergent flanges of the channel of said housing, the ground strip central web being provided in registry with spaced apertures with which the web of the channel of the housing is provided, said metallic web having at said apertures ground contacts yieldably engageable by the ground prongs of such plugs.

5. An elongated electrical outlet according to claim 4 in which the ground contacts comprise tongues extending inwardly from the central web of the ground strip into the path of a ground prong inserted through an aperture in the web of the channel of the housing and through the registering aperture in the metallic web of the ground strip.

6. An elongated electrical outlet according to claim 5 in which the ground strip is provided with a plurality of tongues at different points about the aperture of the ground strip and extending downwardly at a spacing less than the width of the ground prong of the plug whereby the deflection of said tongues by insertion of the ground prong assures positive contact of the plug ground prong with the ground strip.

7. An elongated electrical outlet according to claim 4 in which the central inverted channel of the housing extends through the housing for substantially the length thereof and is open at its end to receive the metallic ground channel, the said housing having terminal closures for the retention of the metallic ground channel and substantially engaged by the ends of the metallic ground channel.

*8. An elongated electrical outlet provided with continuous prong-receiving slots and having its contact prongs disposed in said slots, said outlet comprising a dielectric housing having central and outer longitudinally extending chambers, said housing including a central inverted channel having flanges constituting partitions between said chambers and downwardly converging from a central web with which said channel is provided to provide clearance of said channel flanges with said prongs beneath said slots, the flanges of said channel being connected with bottom walls of the outer chambers of said housing, side walls of said outer chambers extending upwardly from the bottom wall, top walls extending back from said side walls toward said channel and free of connection therewith to provide said slots, the side walls and top walls being formed to provide bights, the side walls further being provided with fulcrum means, substantially flat and elongated contact strips having upper side margins engaged in the respective bights and disposed to extend longitudinally in the outer chambers, said contact strips being engaged with said fulcrum means and supported thereby in positions in which their lower side margins are proximate the flanges of said channel adjacent the bottom walls of said outer chambers and below and offset inwardly of said slots to be deflected away from the flanges of said channel by plug prongs inserted in the respective slots.*

References Cited

The following references, cited by the Examiner, are of record in the patented file of this patent or the original patent.

UNITED STATES PATENTS

| | | | |
|---|---|---|---|
| 2,680,233 | 6/1954 | McFarlin | 339—21 R |
| 2,970,286 | 1/1961 | Modrey | 339—14 R |
| 3,059,204 | 10/1962 | Johnson | 339—14 R |
| 3,081,442 | 3/1963 | Platz | 339—14 R |

ROY LAKE, Primary Examiner

M. S. BICKS, Assistant Examiner

U.S. Cl. X.R.

339—21 R